(12) United States Patent
Kowalski (10) Patent No.: US 7,712,815 B2
(45) Date of Patent: May 11, 2010

(54) ARTICULATING SEAT CUSHION AND LOAD FLOOR FOR PICK UP OR SIMILAR TYPE VEHICLE

(75) Inventor: Michael John Kowalski, Troy, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 256 days.

(21) Appl. No.: 12/017,464

(22) Filed: Jan. 22, 2008

(65) Prior Publication Data
US 2009/0184535 A1   Jul. 23, 2009

(51) Int. Cl.
*B60N 2/02* (2006.01)
(52) U.S. Cl. ............... 296/65.01; 297/311; 297/341
(58) Field of Classification Search ............ 296/65.01, 296/65.03, 65.06, 65.11; 297/311, 312, 337, 297/338, 340, 341
See application file for complete search history.

(56) References Cited

U.S. PATENT DOCUMENTS

| | | |
|---|---|---|
| 6,371,556 B1 | 4/2002 | Arai et al. |
| 6,568,736 B2 | 5/2003 | Jach et al. |
| 6,598,926 B1 | 7/2003 | Price et al. |
| 2005/0012373 A1 | 1/2005 | Fujita et al. |

*Primary Examiner*—Lori L Lyjak
(74) *Attorney, Agent, or Firm*—Greg Brown; Ford Global Technologies, LLC (57) ABSTRACT

The articulated seat assembly to efficiently utilize vehicle compartment space is comprised of a seat back slidably mounted to a floor for horizontal movement relative thereto. A seat pan is equipped with at least first and second seat flange indents on opposite ends of the seat pan to cooperatively engage a floor flange to provide support to the seat pan in first and second pivoted positions. A leg assembly is pivotally attached to the seat pan at a first end and pivotally attached relative to a vehicle floor at a second end. The leg assembly is equipped with a first flat to cooperatively engage the vehicle floor when the leg is in a first pivoted position and a second flat to cooperatively engage the vehicle floor in a second pivoted position. The leg assembly is further equipped with a contour to cooperate with a floor contour to permit pivotal movement of the leg.

19 Claims, 9 Drawing Sheets

ARTICULATING SEAT CUSHION AND LOAD FLOOR FOR PICK UP OR SIMILAR TYPE VEHICLE

TECHNICAL FIELD

The present invention relates to an articulating seat assembly for any row, and particularly the second and third row vehicle seats, wherein the seat portion of the vehicle seat is pivoted from a seat position to a cargo position.

The present invention further relates to an articulating seat assembly for any row, and particularly the second and third row vehicle seats wherein the seat back portion is pivotal to present a cargo position to an operator.

The present invention is further related to an articulating vehicle seat assembly wherein the seat back portion and the seat pan portion are pivotal relative to each other to permit either the pivoting of the seat pan portion to present a cargo surface, or the pivoting of the seat back portion to present a cargo position to an operator.

These and other objects will become apparent upon a reading of the specification and claims.

BRIEF SUMMARY OF THE INVENTION

In one embodiment, the present invention reveals an articulated seat assembly adapted for use as any row of vehicle seats, and particularly as second and third row seats in a vehicle. The seat assembly has a seat back that is equipped with a seat cushion, slidably mounted to a floor for horizontal movement relative thereto and a seat pan equipped with at least first and second seat flange indents on opposite ends of said seat pan to cooperatively engage a floor flange to provide support to said seat pan in first and second pivoted positions. The seat pan is supported by a leg assembly pivotally attached to the seat pan at a first end and pivotally attached relative to a floor at a second end. The leg assembly is equipped with a first flat to cooperatively engage the floor when the leg is in a first pivoted position and a second flat to cooperatively engage the floor in a second pivoted position. The leg assembly is further equipped with a contour to cooperate with a floor contour to permit pivotal movement of the leg. The leg assembly may be pivotally mounted on a flange attached to the floor to facilitate pivotal movement of the leg relative to the floor. The legs and seat pan are mounted in a well in the vehicle floor.

In a first position, the seat pan position presents a seating surface to an operator, and in a second position, pivoted relative to the first position, the seat pan presents a cargo surface to an operator. Thus, it should be apparent that in the seat position, the seat pan presents a seat cushion to an operator, and in the cargo position, the seat pan presents a cargo surface to the operator. When the seat pan is in its first pivoted position, the seat back is in a forward slide position, and when the seat pan is in a second pivoted position, the seat back is in a rearward slide position.

The seat back is attached to said seat pan by a release latch to permit locking engagement with the seat pan. The seat back is pivotally attached at one end relative to the slide to permit pivotal rotation of the seatback relative to the slide. In this regard, the back cushion has a contour cooperative to the seat cushion in the pan to permit movement of the seatback about the slide pivot to present a cargo surface to an operator without movement of the seat pan.

In another embodiment, the present invention reveals an articulated seat assembly for use any vehicle row of seats, and in particular, is useful in the vehicle second and third row seat sections. The articulated seat assembly is comprised of a seat back portion pivotally mounted on a slide to permit forward and rearward motion of the seat back relative to the vehicle. The seat back portion has a seat back cushion mounted therein and a cargo surface opposite the seat back surface. The seat back is mounted on a raised portion of the vehicle floor. The assembly further includes a seat pan having a width and length and equipped with at least first and second seat flange indents on opposite ends of the seat pan to cooperatively engage a floor flange mounted on the raised vehicle floor portion to provide support to the seat pan in first and second pivoted positions. The seat pan is equipped with a seat cushion to present a seat surface, and a cargo surface opposite the seat surface. The seat pan and the seat back are engageable relative to each other with a releasable latch mechanism and the seat back is further pivotally moveable relative to the seat pan. There are two leg assemblies per each seat pan. Each leg is pivotally attached to opposing sides of the seat pan width at a first end and pivotally attached relative to the vehicle floor at a second end. Each leg is equipped with a first flat to cooperatively engage the vehicle floor when the leg is in a first pivoted position and a second flat to cooperatively engage vehicle floor in a second pivoted position. Each of the flats is located approximately 90° relative to each other on the leg, and each leg is further equipped with a contour to cooperate with a floor contour to permit pivotal movement of the leg. Each leg is mounted on a flange extending from a well in the floor to present the seat pan portion in a position relative to the seat back portion of the seat assembly.

When the seat pan is in a first seat pan position and the seat back is in a forward position in its slide, it presents a seating surface to an operator. When the seat pan is in a second seat pan pivoted position and the sat back is in a rearward side position, it presents a cargo surface to the operator. When the seat pan is in its first pivoted position, the seat back is in a forward slide position, and when the seat pan is in a second pivoted position, the seat back is in a rearward slide position.

In another embodiment, the seat back is also pivotal relative to the seat pan such that it can be made to fold over the seat pan without movement of the seat pan relative to its pivotal attachments. In this regard, the back cushion has a contour cooperative to a seat cushion in the seat pan to permit movement of the seatback about its pivot to present a cargo surface to an operator without movement of the seat pan.

DETAILED DESCRIPTION OF THE PREFERRED EMBODIMENT(S)

Figure 1:
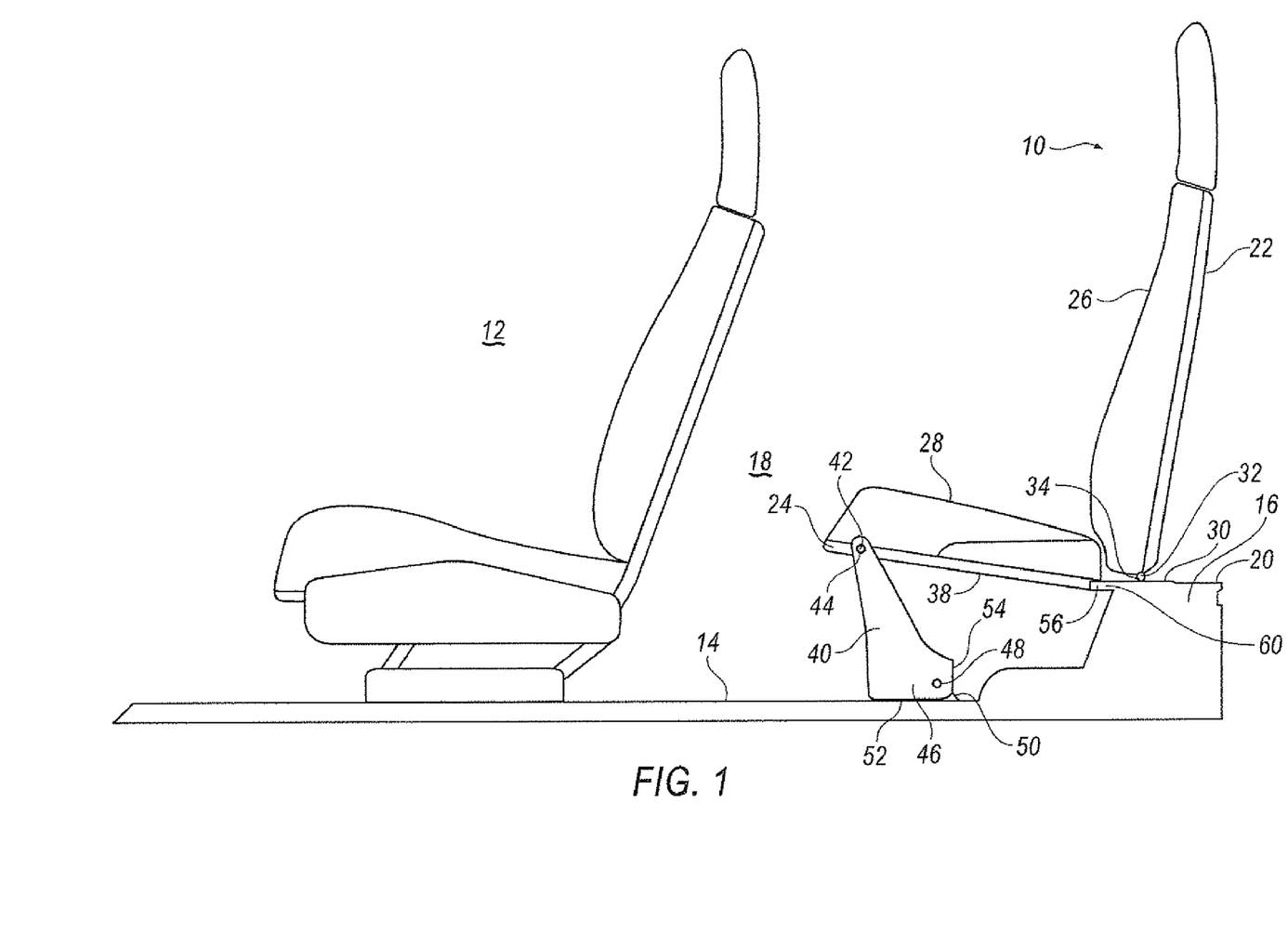
FIG. 1 is a side view of the articulating seat assembly of the present invention in a vehicle occupant compartment.
Figure 2:
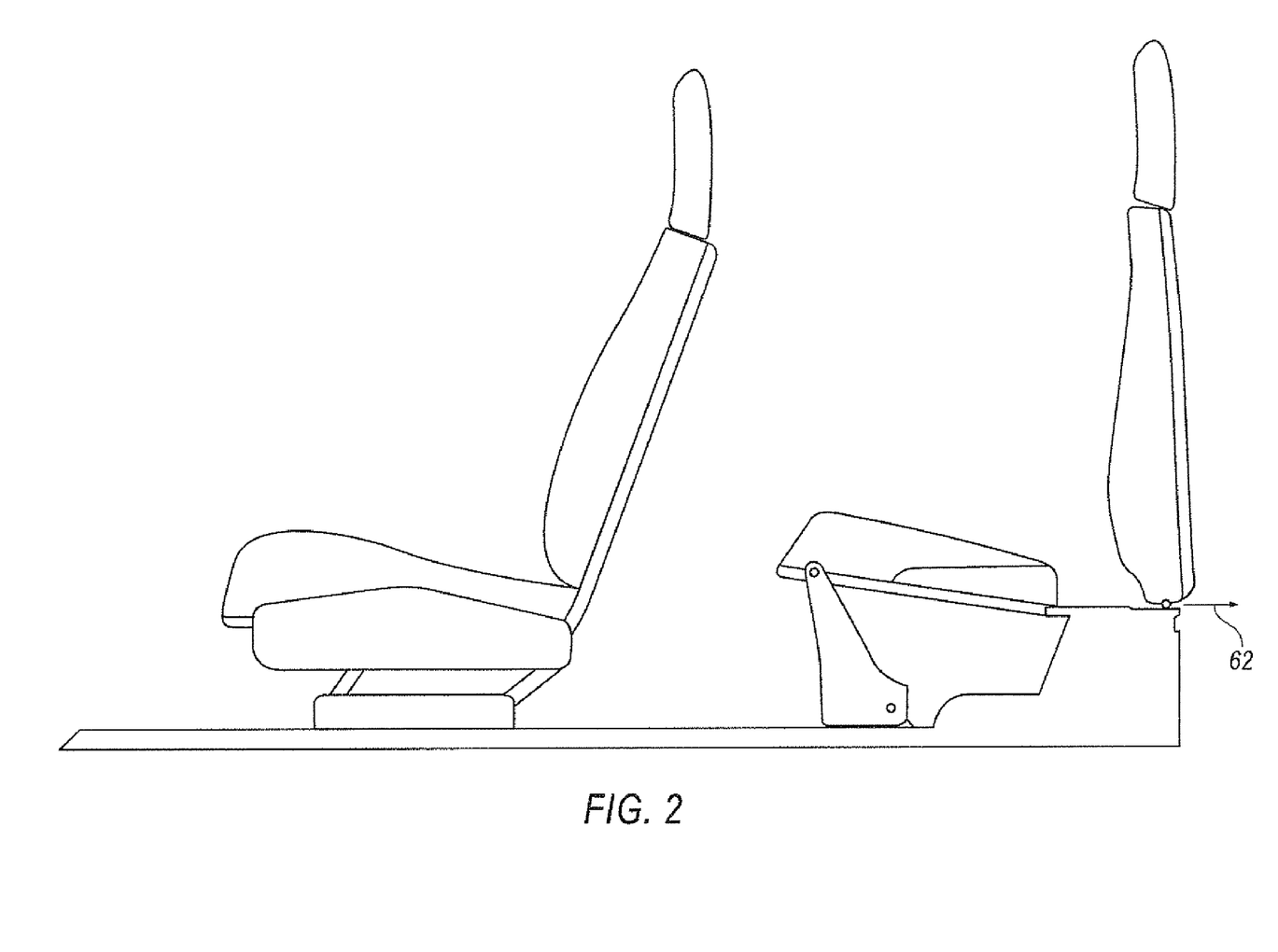
FIG. 2 is a side view of the articulating seat assembly of FIG. 1, showing the movement of the seat back relative to the seat pan to facilitate pivotal movement of the seat pan to present a cargo surface to an operator.

Turning now to the drawings wherein like numbers refer to like structures, FIG. 1 is a side view of the articulating seat assembly of one aspect of the present invention. Specifically, seat assembly 10 is depicted as a third row seat in a vehicle passenger compartment 12, having a floor and a raised portion 16, such that the floor is a well 18 in comparison with the raised portion 20 of the floor. While the third row vehicle seats is discussed in detail, those skilled in the art recognize that the structure described may be any row of seats, and the invention has application in any row of vehicle seats, and in particular, with the second and third row vehicle seats. The seat assembly is comprised of a seat back 22, and a seat pan 24. The seat back is equipped with a seat back cushion 26 that may be configured to cooperatively engage the seat cushion 28 carried in the seat pan in a manner to be hereafter described. The seat back is carried along a slide 30 mounted on said raised floor portion. In addition, the seat back is pivotally moveable relative to the slide by a flange 32 to which the seat back is pivotally mounted by pivot 34. The pivot permits the seat back to be pivotally moveable relative to the seat pan by about 180° of pivot. The slide portion permits the seatback to be moved horizontally or rearwardly and forwardly relative to the vehicle. The seat back may also be pivotally movable along the pivot to permit the seat back cushion to be moved into abutment with the seat pan portion to present a cargo space to all operator. In addition, the seat pan has a hard plastic or other suitable material back so that upon proper pivotal movement, the seat pan can present a cargo surface to an operator without pivotal movement of the seat back. The seat back is further cooperatively engaged to a seat pan portion by a latch mechanism that permits the seat back to be locked into engagement with the seat pan in one position, and, upon release of the latch mechanism, the seat back is free to slide along the slide carried by the raised floor portion. The latch mechanism can be of any sort suitable to the task, as is well known to those skilled in the art.

The seat pan has a length and width suitable to the compartment into which it is fitted, and carries a seat cushion 36 so that, in one position, the seat pan presents a seat to an operator. The seat cushion is equipped with an engagement portion 37, to engage the leg at portion 41 for additional support and stability when the seat pan is pivoted to present a cargo space as will hereinafter be described. The seat pan is further comprised of a cargo surface 38, which may be a hard plastic, a metal or any other suitable material to present a durable cargo surface to the operator when the seat pan is pivoted as will hereinafter be explained. In addition, the cargo surface may be carpeted as is known in the art to present a full carpeted cargo bed as may be desirable. The seat pan is pivotally carried upon leg assembly 40 that is pivotally attached at one end 42 at pivot 44 to one side of the seat width, and pivotally attached at a second end 46 at pivot 48 to pivotally move relative to the floor. Those skilled in the art understand that these may be an identical leg opposite the leg 40 along the width of the seat that may be pivotally attached to the seat pan and a pivot flange to the floor, or that leg assembly 42 may extend along the width of the seat. The leg pivot 48 may be with a floor flange 50 attached to the floor to permit pivotal movement of the leg relative to the floor in a manner to be hereinafter described. The leg is equipped with a first flat portion 52 that cooperatively engages the floor in a first position to support the leg in an upright position to support the seat pan to present a seat portion to an operator. A second flat portion 54 is disposed approximately 90° relative to the first flat portion, but any offset of the second flat is contemplated as required to separate the flats from each other and accommodate the vehicle floor contour. The second flat is to support the leg when in the pivoted position to permit the seat pan to present the cargo surface when the seat pan is pivoted in the manner to be hereinafter described. The seat pan cargo surface has indents 56 and 58 (58 not shown) in opposite ends of the length of the seat pan to cooperatively engage a seat support flange tab 60 to lend support when the seat pan presents either the seat portion or the cargo portion.

Figure 3:
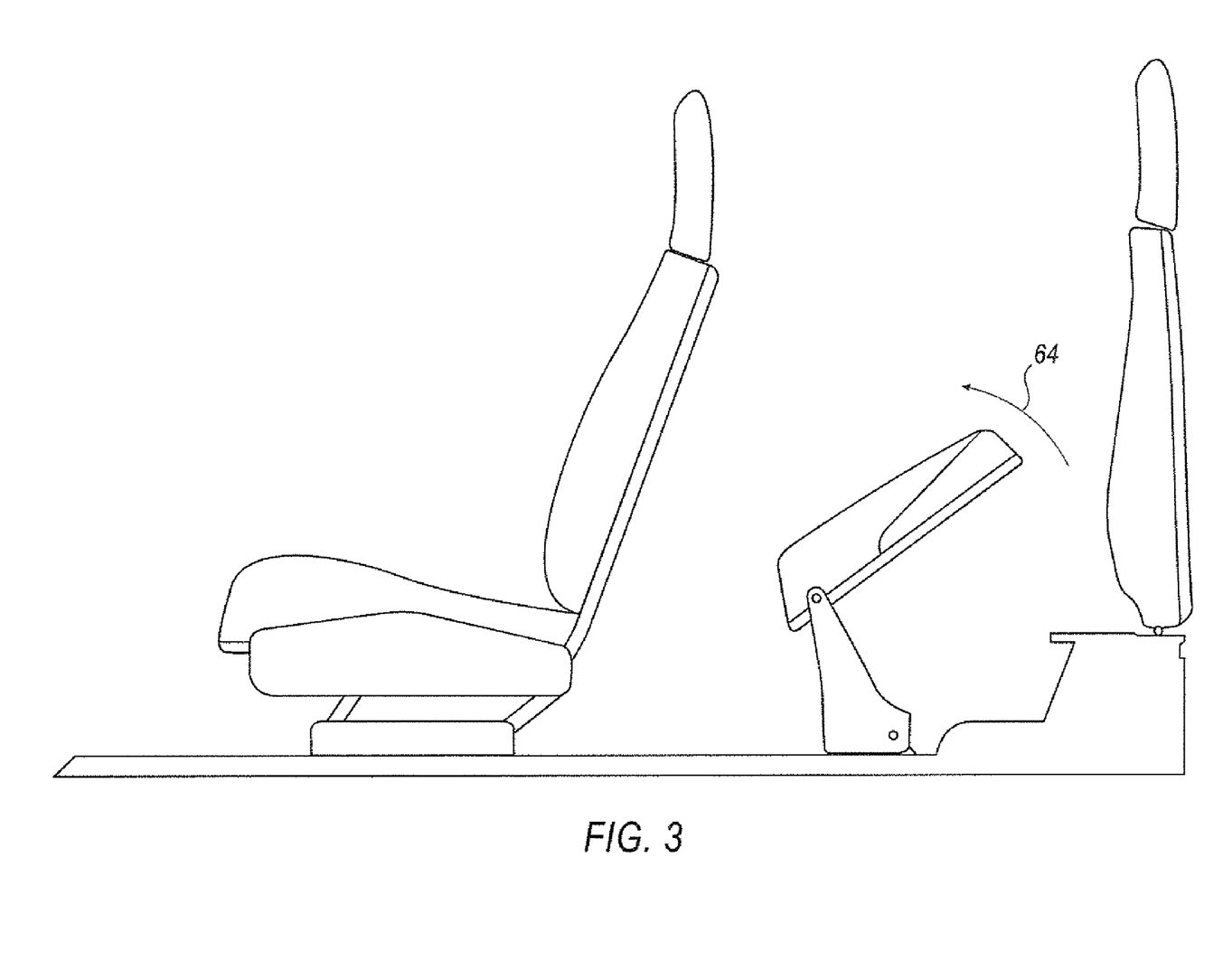
FIG. 3 is a side view of the articulating seat assembly of FIG. 2, showing the pivotal movement of the seat pan from the tabs.
Figure 4:
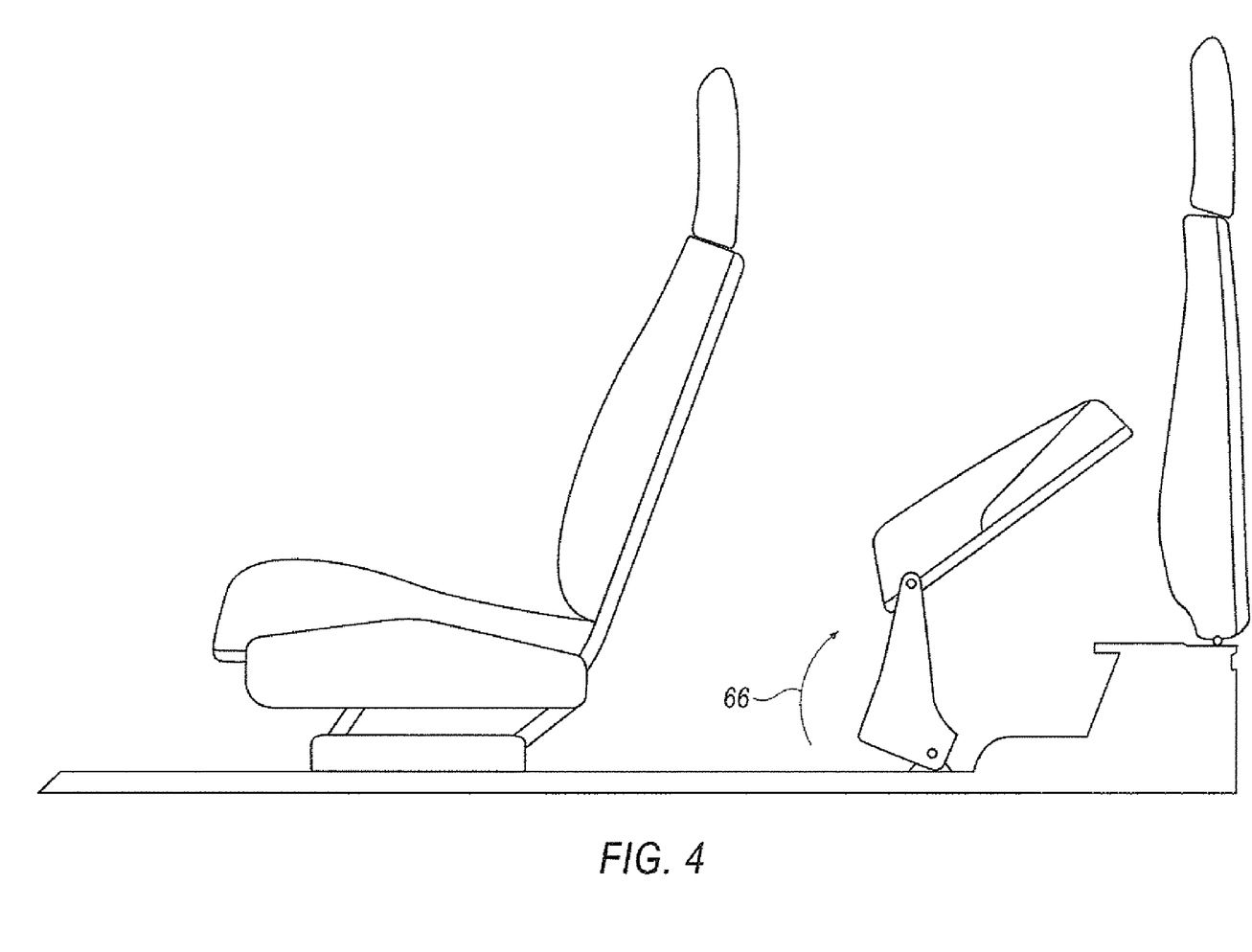
FIG. 4 is a side view of the articulating seat assembly of FIG. 3, showing the seat pan pivoted and the pivotal movement of the leg to present a cargo position to an operator.
Figure 5:
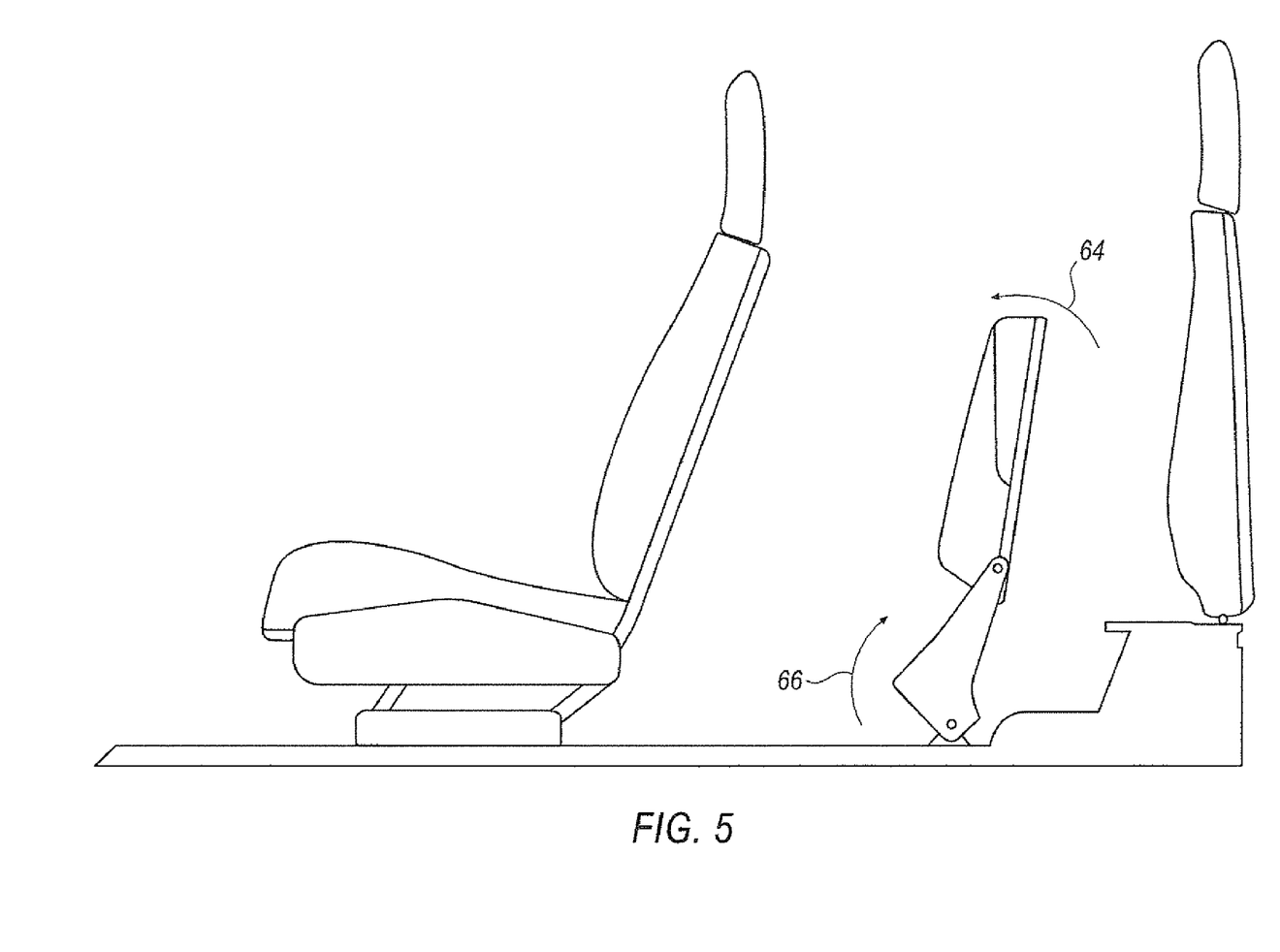
FIG. 5 is a side view of the articulating seat assembly of FIG. 4, showing the seat pan pivoted to a substantially vertical position.
Figure 6:
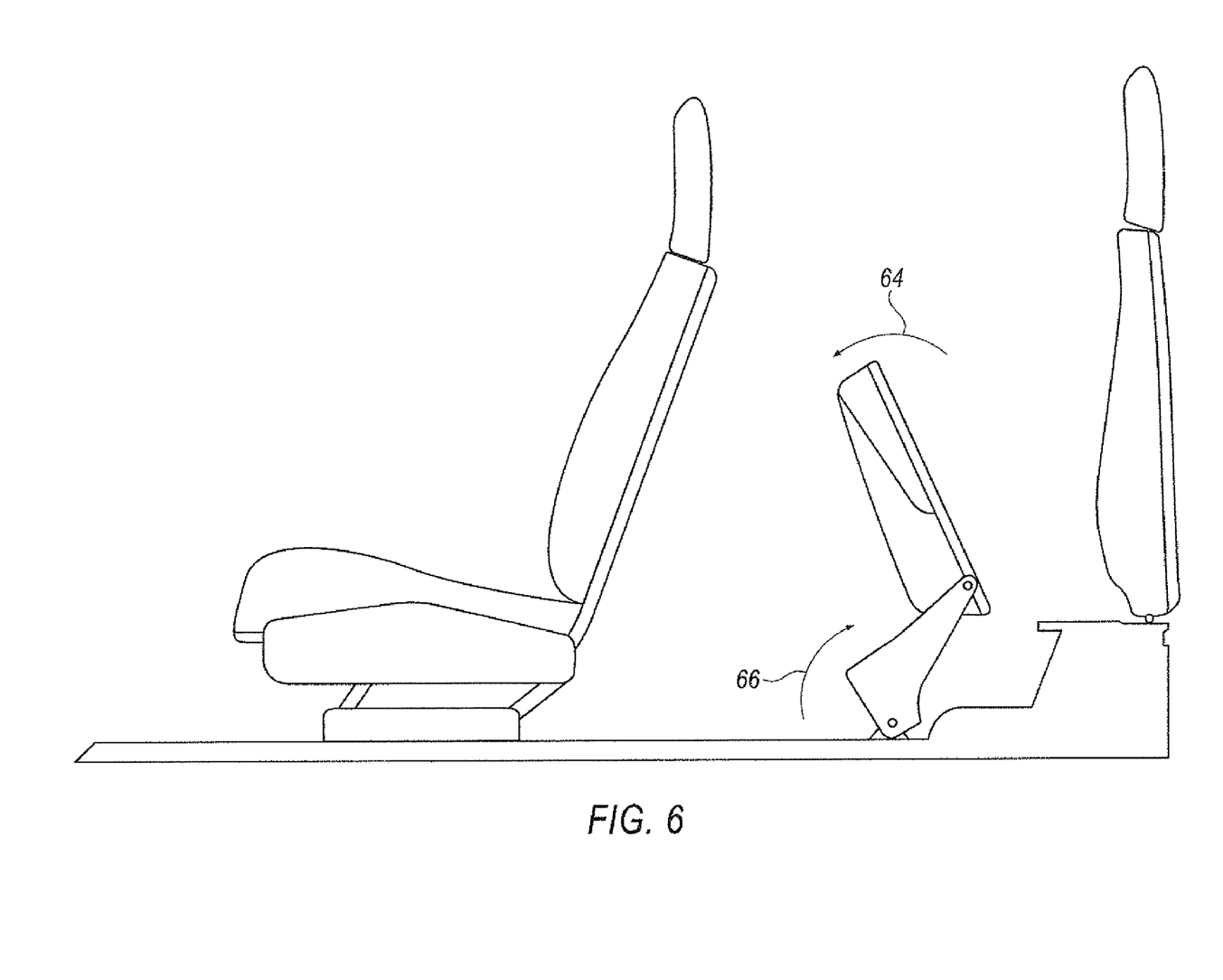
FIG. 6 is a side view of the seat assembly of FIG. 5, showing the pivotal movement of the leg and the seat.
Figure 7:
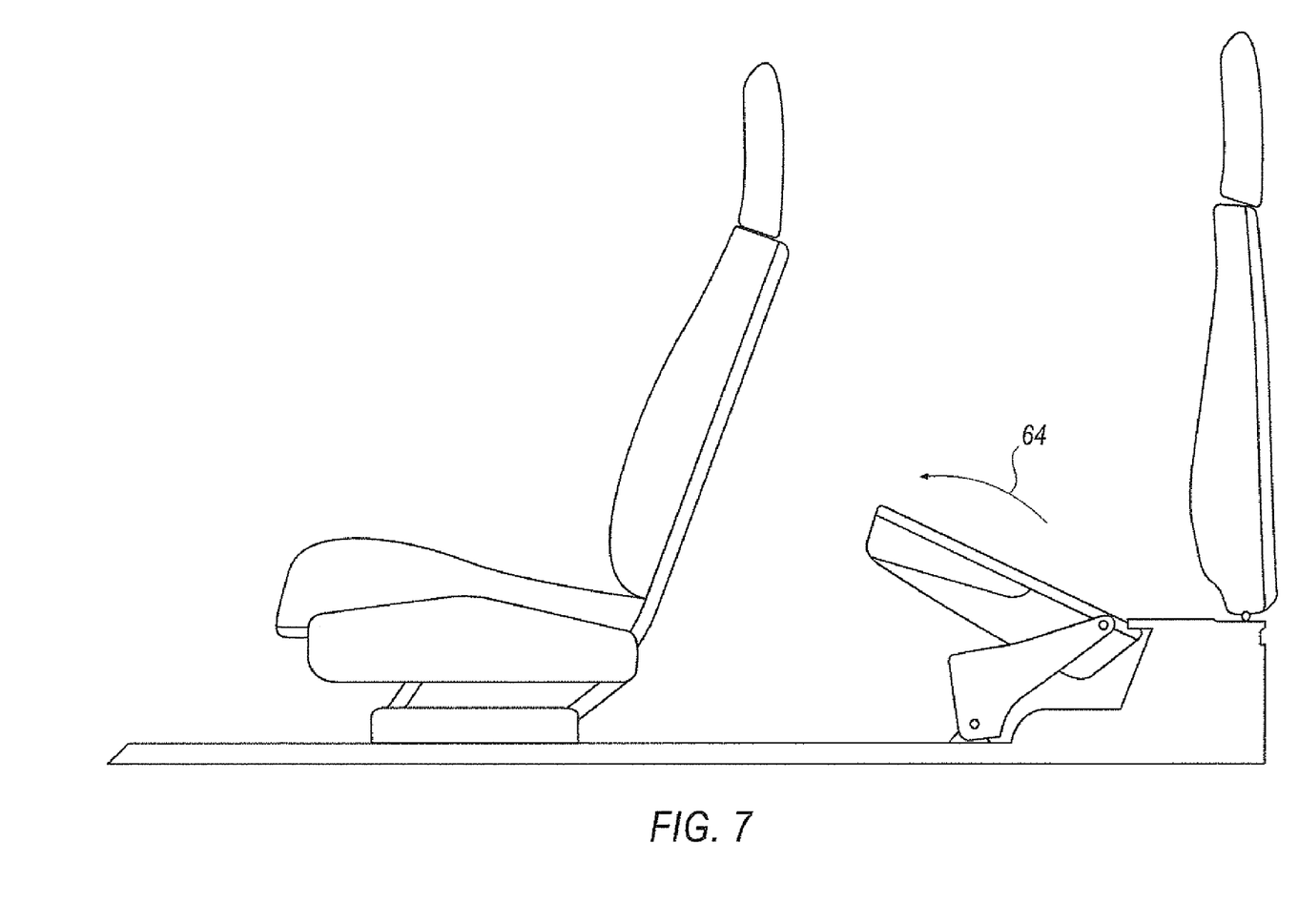
FIG. 7 is a side view of the seat assembly of FIG. 6, showing the pivotal movement of the leg and the seat pan.
Figure 8:
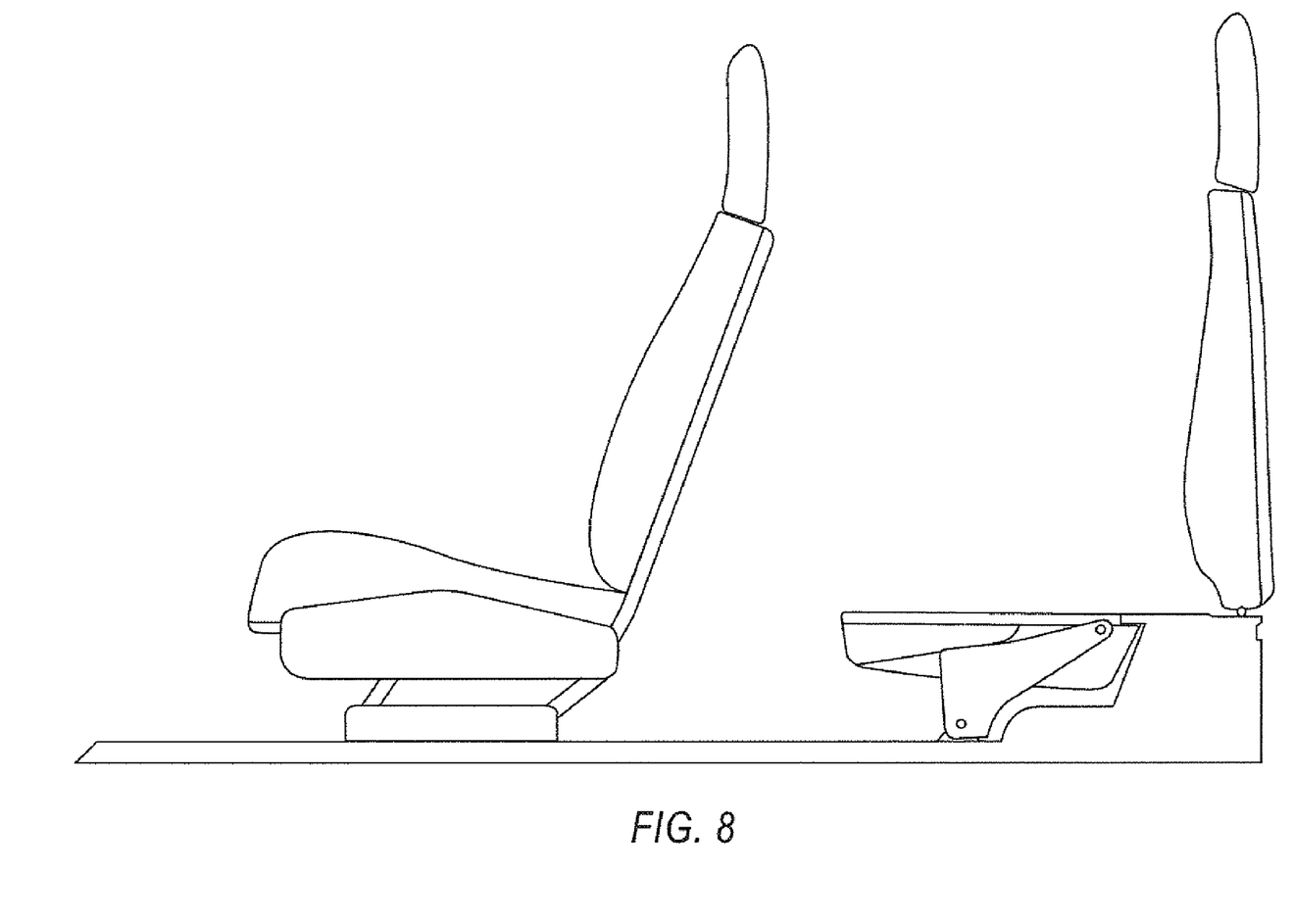
FIG. 8 is a side view of the seat assembly of FIG. 7, showing the seat pan folded into the raised floor section to present a cargo space.

FIGS. 2 through 8 show the sequential movement of the seat back and seat pan portion during articulation to present a cargo surface to an operator. Specifically, the latch mechanism is released, and the seatback may be moved in direction 62 along the slide free of and independent of the seat pan portion. The seat back is slid rearwardly along the slide relative to the vehicle to give access to the seat pan. The seat pan portion is then lifted to facilitate pivotal movement of the seat pan about pivot 42 along movement 64, as seen in FIG. 3. In FIG. 4, the leg is pivoted in direction of movement 66 to facilitate continued movement of the seat pan. As seen in FIG. 5, when the seat pan has reached a maximum point in its rotation about pivot 42 along movement 64, the leg can be understood to have moved pivotally about pivot 44. As seen in FIG. 6, continued pivotal movement of the seat pan along movement 64 and pivotal movement of the leg along movement 66 causes the seat pan to assume a folding position relative to the leg. In addition, the first flat is disengaged from the floor, causing the second flat to approach engagement with the floor. As seen in FIG. 7, the seat pan is continued to be pivotally rotated by an operator along movement 64 so that the cargo surface is now presented and the seat cushion surface is under the cargo surface. The contour of the leg is such that it accommodates the contour of the raised floor portion so that pivoting of the leg is facilitated. In addition, the tabs engage the indents in the seat back portion, to offer support and act as a stop against continued pivotal rotation of the seat pan as it assumes its cargo position. As seen in FIG. 8, the seat pan is rotated approximately 180° relative to its starting position so that the indents are fully engaged with the flange tabs and the leg is completely pivoted so that the second flat engages the floor surface. The seat pan having been rotated, the third row seat presents a cargo space to an operator.

Figure 9:
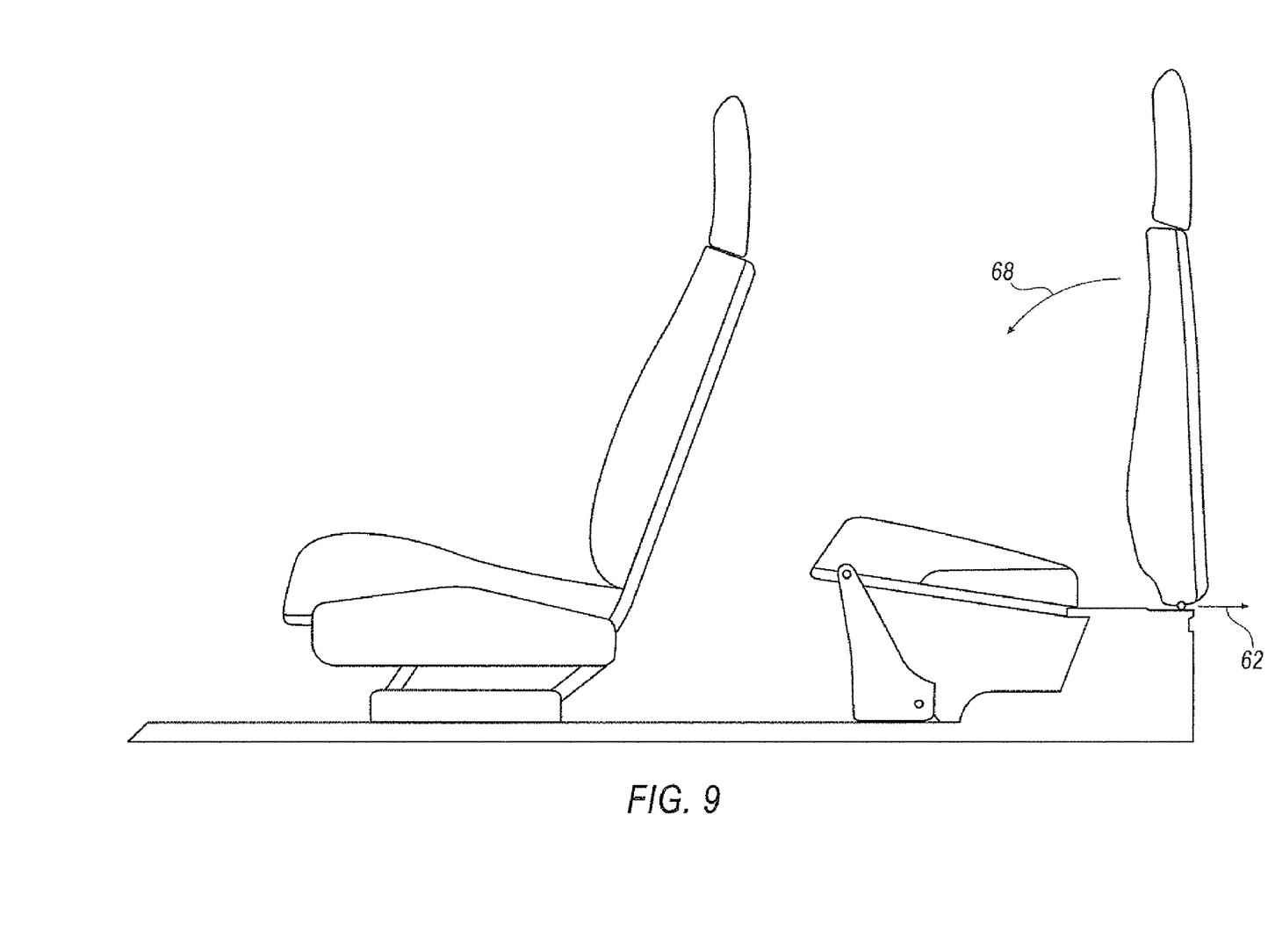
FIG. 9 is a side view of the seat assembly of FIG. 2, showing the seat back movement about a pivot to present a cargo surface.

In another embodiment, as seen in FIG. 9, the seat back may be pivoted about the pivot on the slide at follows. The seat back is released from engagement with the seat pan by releasing the latch mechanism. The seat back may be moved rearward in direction 62 along the slide and then pivoted forward along direction 68 until the seat back cushion cooperatively abuts the seat pan cushion so that the seat back portion presents a cargo surface to an operator.

The words used in the specification are understood to be words of description, not words of limitation. Many variations will occur to those skilled in the art without departing from the scope and spirit of the invention as set forth in the appended claims.

What is claimed as new and desired to be protected by Letters Patent of the United States is:

1. An articulated seat assembly, comprising:
   a seat back slidably mounted to a floor for horizontal movement relative thereto;
   a seat pan equipped with at least first and second seat flange indents on opposite ends of said seat pan to cooperatively engage a floor flange to provide support to said seat pan in first and second pivoted positions; and a leg assembly pivotally attached to said seat pan at a first end and pivotally attached relative to said floor at a second end; said leg equipped with a first flat to cooperatively engage said floor when said leg is in a first pivoted position and a second flat to cooperatively engage said floor in a second pivoted position; said leg further equipped with a contour to cooperate with a floor contour to permit pivotal movement of said leg.

2. The articulated seat assembly of claim 1, wherein said leg is pivotally mounted to a flange extending from said floor for pivotal movement relative thereto.

3. The articulated seat assembly of claim 1, wherein said first seat pan position presents a seating surface to an operator, and said second seat pan pivoted position presents a cargo surface to said operator.

4. The articulated seat assembly of claim 1, wherein when said seat pan is in its first pivoted position, said seat back is in a forward slide position, and when said seat pan is in a second pivoted position, said seat back is in a rearward slide position.

5. The articulated seat assembly of claim 1, wherein said seat pan is equipped with a seat cushion to present a seating surface.

6. The articulated seat assembly of claim 1, wherein said seat back is equipped with back cushions to present an occupant back seat surface.

7. The articulated seat assembly of claim 1, wherein said seat back is attached to said seat back by a release latch to permit locking engagement with said seat pan when said seat pan is in a seat position.

8. The articulated seat assembly of claim 1, wherein said seat back is pivotally attached at one end relative to said slide to permit pivotal rotation of said seatback relative to said slide.

9. The articulated seat assembly of claim 8, wherein said back cushion has a contour cooperative to a seat cushion in said pan to permit movement of said seatback about said pivot to present a cargo surface to an operator without movement of said seat pan.

10. The articulated seat assembly of claim 1, wherein said seat pan is mounted in a well portion of said floor.

11. The articulated seat assembly of claim 1, wherein said seat is equipped with an engagement surface to abut a surface on said leg when the seat pan is pivoted to present a cargo surface.

12. An articulated seat assembly for use in vehicle third row seat sections, comprising:
    a seat back portion pivotally mounted on a slide to permit forward and rearward motion of said seat back relative to said vehicle; said seat back portion having a seat back cushion mounted therein and a cargo surface opposite said seat back surface; said seat back mounted on a raised portion of said vehicle floor;
    a seat pan having a width and length and equipped with at least first and second seat flange indents on opposite ends of said seat pan to cooperatively engage a floor flange mounted on said raised vehicle floor portion to provide support to said seat pan in first and second pivoted positions; said seat pan equipped with a seat cushion to present a seat surface, and a cargo surface opposite said seat surface; said seat pan and said seat back engageable relative to each other with a releasable latch mechanism; said seat back pivotally moveable relative said seat pan;
    two leg assemblies per seat pan, each said leg pivotally attached to opposing side of said seat pan width at a first end and pivotally attached relative to said floor at a second end; said leg equipped with a first flat to cooperatively engage said floor when said leg is in a first pivoted position and a second flat to cooperatively engage said floor in a second pivoted position; said flats located approximately 90° said leg further equipped with a contour to cooperate with a floor contour to permit pivotal movement of said leg; each leg mounted in a well in said floor to present said seat pan portion.

13. The articulated seat assembly of claim 12, wherein said leg is pivotally mounted to a flange extending from said floor for pivotal movement relative thereto.

14. The articulated seat assembly of claim 12, wherein said first seat pan position presents a seating surface to an operator, and said second seat pan pivoted position presents a cargo surface to said operator.

15. The articulated seat assembly of claim 12, wherein when said seat pan is in its first pivoted position, said seat back is in a forward slide position, and when said seat pan is in a second pivoted position, said seat back is in a rearward slide position.

16. The articulated seat assembly of claim 12, wherein said seat back is pivotally attached at one end relative to said slide to permit pivotal rotation of said seatback relative to said slide.

17. The articulated seat assembly of claim 16, wherein said back cushion has a contour cooperative to a seat cushion in said pan to permit movement of said seatback about said pivot to abutment with the seat cushion in the seat pan to present a cargo surface to an operator without pivotal movement of said seat pan.

18. The articulated seat assembly of claim 12, wherein said seat cushion is equipped with an engagement surface to abut a surface on the leg when the seat pan is pivoted to present a cargo surfaces.

19. A vehicle having an occupant compartment and equipped with an articulated seat assembly for use in vehicle third row seat sections, comprising:
    a seat back portion pivotally mounted on a slide to permit forward and rearward motion of said seat back relative to said vehicle; said seat back portion having a seat back cushion mounted therein and a cargo surface opposite said seat back surface; said seat back mounted on a raised portion of said vehicle floor;
    a seat pan having a width and length and equipped with at least first and second seat flange indents on opposite ends of said seat pan to cooperatively engage a floor flange mounted on said raised vehicle floor portion to provide support to said seat pan in first and second pivoted positions; said seat pan equipped with a seat cushion to present a seat surface, said seat cushion equipped with an engagement surface; said seat cushion further equipped with a cargo surface opposite said seat surface; said seat pan and said seat back engageable relative to each other with a releasable latch mechanism; said seat back pivotally moveable relative said seat pan; and
    two leg assemblies per seat pan, each said leg pivotally attached to opposing side of said seat pan width at a first end and pivotally attached relative to said floor at a second end; said leg equipped with an engagement portion to abut said seat cushion engagement when the seat pan is pivoted to a cargo surface; said leg further equipped with a first flat to cooperatively engage said floor when said leg is in a first pivoted position and a second flat to cooperatively engage said floor in a second pivoted position; said flats located approximately 90° said leg further equipped with a contour to cooperate with a floor contour to permit pivotal movement of said leg; each leg mounted in a well in said floor to present said seat pan portion.

* * * * *